H. A. HANNUM.
MILK-COOLER OR HEATER.
No. 174,810. Patented March 14, 1876.
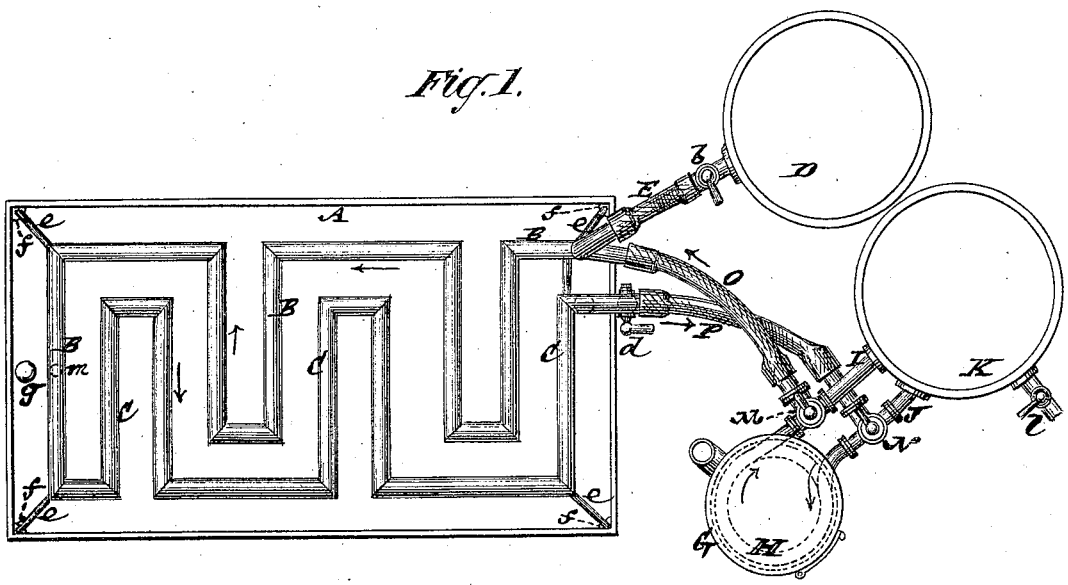
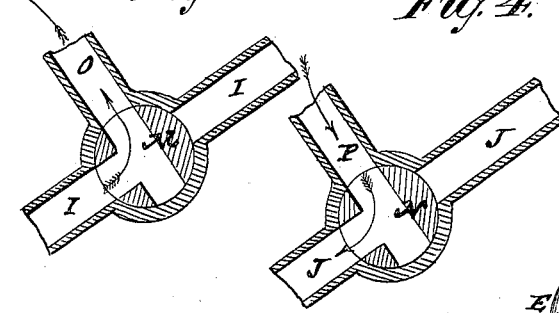
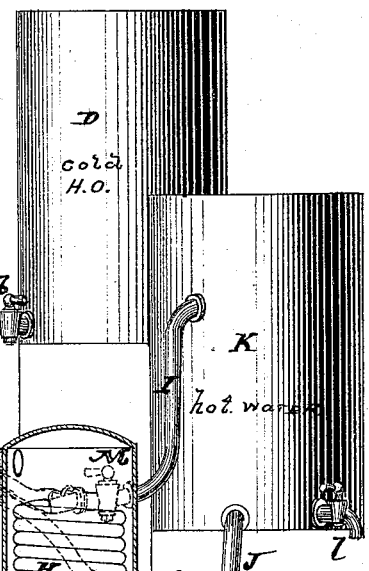
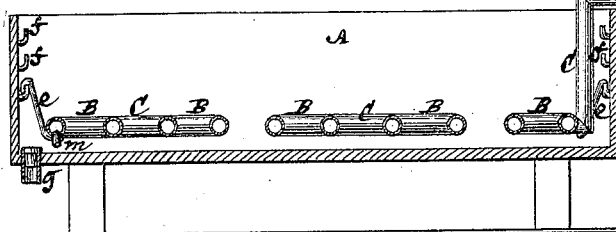

UNITED STATES PATENT OFFICE.

HENRY A. HANNUM, OF CAZENOVIA, NEW YORK.

IMPROVEMENT IN MILK COOLERS OR HEATERS.

Specification forming part of Letters Patent No. 174,810, dated March 14, 1876; application filed February 16, 1876.

*To all whom it may concern:*

Be it known that I, HENRY A. HANNUM, of Cazenovia, in the county of Madison and State of New York, have invented certain new and useful Improvements in Milk-Pans with attached devices for regulating the temperature of the milk therein; and I do hereby declare that the following is a full, clear, and exact description of the same, reference being had to the accompanying drawing, which forms part of this specification.

This invention consists in novel means and combinations of devices for cooling or heating, as required, milk for dairy purposes, including a system of reverse coils, whereby an even temperature is secured for the entire body of milk in the pan, the cooling or heating surfaces are capable of adjustment to suit different quantities of milk in the pan, and numerous other facilities are obtained.

In the accompanying drawing, Figure 1 represents a plan of a milk-pan with attached devices for regulating the temperature of the milk. Fig. 2 is a partially sectional longitudinal elevation of the same; and Figs. 3 and 4, sectional views, upon a larger scale, of certain details.

A is the pan in which the milk is put to have its temperature regulated as required. B and C are reverse connected coils of pipes arranged within the pan, and through which hot or cold water is circulated, as required, to give to the milk its required temperature.

When it is required to cool the milk, cold water, by opening a cock, b, is run from a cold-water reservoir or tank, D, through a hose or metallic flexible connection, E, into the one coil of pipes B, and from thence back through the reverse coil of pipes C, and out through a discharge-branch provided with a cock, d. These reverse coils or zigzag series of pipes B C are arranged in relation with each other, so that the varying temperatures of the water in circulating through both sets of pipes, as controlled by the temperature of the milk, approximate throughout the entire circulation— that is, the coldest water in the pipes B is in proximity to the warmest water in the pipes C at the one end of the pan, and vice versa at the opposite end of the latter. This applies whether circulating hot or cold water through the reverse coils to regulate the temperature of the milk, and serves to give an even temperature to the milk in different portions of the pan and throughout it. These pipes B and C are arranged loosely in the pan, so that they may be adjusted to any desired height therein, according to the depth or body of the milk in the pan. To this end said pipes B C are provided with springs or hook-catches e, which bear against the sides or corners of the pan, or hitch into notches or over projections f in or on the sides or corners of the pan. The connections outside of these pipes B C are made flexible to provide for such adjustment of the pipes in the pan, and each of said pipes is attached to its connections by means of union-couplings, which admit of the detachment of the pipe-connections when necessary.

In the bottom of the pan A there is a stopper, g, which, when removed, allows the skimmed or sour milk to run out of the pan into a suitable receiver, or otherwise.

G is a furnace or heater placed in any desired proximity to the pan, and provided with a coil of pipes, H, the two ends of which connect above and below, by pipes I J, with a hot-water tank, K. A circulation is thus kept up between the water in the tank K and the coil of pipes H in the furnace.

Between the heater G and hot-water tank K I connect the pipes I and J, respectively, subject to the control of two three-way cocks, M and N, with the coils B and C, by means of tubular connections O P, which also should be more or less flexible.

When it is required to heat the milk in order to preserve it, or for the purpose of making cheese, I first shut the stop-cocks b and d and turn the three-way cock M, as shown in Fig. 3. This stops the heated water flowing from the coil H back into the hot-water tank K, but opens communication, by the connection O, with the pan-coil B, through which and the reverse coil C the hot water circulates and escapes through the connection P back into the coil H within the heater, when the three-way cock N is turned, as represented in Fig. 4. The water thus returned is reheated and again circulated through the reverse coils B C, and such circulation kept up until the milk in the pan A is sufficiently heated, after which the cocks M N are turned to shut off communication with the tubular connections O and P, to stop circulation in the coils B C, and to restore circulation by the pipes I and J between the coil H of the heater and the tank K. The hot-water tank K may be used for other purposes about the premises, for which purpose said tank is provided with a draw-off cock, *l*. Said tank K may be replenished from the waste-water after it has been used for cooling the milk, by shutting the stop-cock *d* and turning the three-way cocks M and N, so that the escape-water will be discharged into said tank. By means of the three-way cocks M and N I not only reduce the number of cocks that otherwise would be necessary, but avoid all possibility of accident by the bursting of the coil or coils in case both ends thereof were shut off tight through inadvertence or mistake, inasmuch as, in whichever way these three-way cocks are turned, there will be a chance for the water to back up, and any steam that may be generated to blow off, so as to prevent the bursting of the coils.

When the pan A is empty it may readily be scalded out and cleaned, also the reverse coils B C be cleaned by opening a stopper, *m*, on the meeting end of the reverse coils, and allowing the hot water to run from the tank K through the coils and tubing out into the pan until it rises to a sufficient height in the pan, after which it may be allowed to run off through the opening in the bottom of the pan.

Instead of the cold-water tank D, a head of water otherwise obtained may be used.

I claim—

1. The reverse connected coils B C, made adjustable up or down within the pan A by means of springs or hook-catches *e* and fixed notches or projections *f*, essentially as and for the purpose herein set forth.

2. The combination of the three-way cocks M N, the heater G, and coil H, the hot-water tank K, the pipes I J, the pipes O P, and the coils B C in the pan A, essentially as specified.

3. The combination of the cold-water-supply connection E, the inlet and outlet hot-water connections O P, the reverse pan-coils B C, the heater G and coil H, the hot-water tank K, the pipes I J, and the three-way cocks M N, substantially as described.

HENRY A. HANNUM.

Witnesses:
H. H. COLTON,
S. L. LOOMIS.